(12) United States Patent
Keune

(10) Patent No.: US 11,684,013 B2
(45) Date of Patent: Jun. 27, 2023

(54) BALING APPARATUS

(71) Applicant: AGCO International GmbH, Neuhausen (CH)

(72) Inventor: Tobias Keune, Wolfenbuttel (DE)

(73) Assignee: AGCO International GmbH, Neuhausen (CH)

( * ) Notice: Subject to any disclaimer, the term of this patent is extended or adjusted under 35 U.S.C. 154(b) by 0 days.

(21) Appl. No.: 17/661,495

(22) Filed: Apr. 29, 2022

(65) Prior Publication Data
US 2022/0346322 A1 Nov. 3, 2022

(30) Foreign Application Priority Data

Apr. 30, 2021 (GB) .................................... 2106244

(51) Int. Cl.
*A01F 15/12* (2006.01)
*A01F 15/07* (2006.01)

(52) U.S. Cl.
CPC ...... *A01F 15/071* (2013.01); *A01F 2015/072* (2013.01); *A01F 2015/076* (2013.01)

(58) Field of Classification Search
CPC .............. B65H 16/005; B65H 16/024; B65H 19/2223; A01F 2015/072; A01F 2015/0725; A01F 15/0715; A01F 15/071
See application file for complete search history.

(56) References Cited

U.S. PATENT DOCUMENTS

| | | | | |
|---|---|---|---|---|
| 3,204,887 A | * | 9/1965 | Hansen | B65H 23/02 242/559.2 |
| 3,386,672 A | * | 6/1968 | Lamon | B65H 19/1868 242/555.2 |
| 4,891,930 A | * | 1/1990 | Schaefer | A01F 15/071 414/24.6 |
| 4,934,575 A | * | 6/1990 | Mustafa | A47K 10/36 225/46 |
| 5,241,906 A | * | 9/1993 | Kansaku | B65H 16/06 226/110 |

(Continued)

FOREIGN PATENT DOCUMENTS

EP 2932820 A1 * 10/2015 ........... A01F 15/071

OTHER PUBLICATIONS

UK Intellectual Property Office, Search report for priority UK Application No. GB2106244.3, dated Oct. 21, 2021.

*Primary Examiner* — Andrew M Tecco

(57) ABSTRACT

A binding material storage apparatus including a rotary magazine for storage of binding material rolls, rotationally supported about a horizontal axis between two side elements. A magazine may be rotated between a number of discrete positions including a dispense position, each suitable for storage of a roll of binding material. The magazine includes first and second end plates between which support elements extend, one support for each discrete position, each of the supports mounted for free rotation within the magazine. At each discrete position a spindle is mounted for free rotation within the second end plate. An electrically controlled braking gear is supported on the second side. Each spindle is connected to an associated support and an associated first gear. The electrically controlled braking gear engages the first gear in the dispense position to control the speed of rotation of the support element in said position.

8 Claims, 6 Drawing Sheets

(56) References Cited

U.S. PATENT DOCUMENTS

| | | | | |
|---|---|---|---|---|
| 10,299,439 | B2 * | 5/2019 | Simmons | A01F 15/0715 |
| 10,356,983 | B2 * | 7/2019 | Simmons | A01F 15/071 |
| 2013/0125518 | A1 * | 5/2013 | Smith | A01F 15/0715 |
| | | | | 53/582 |
| 2015/0296715 | A1 * | 10/2015 | Simmons | B65H 16/024 |
| | | | | 56/341 |
| 2018/0334274 | A1 * | 11/2018 | Brizek | B65B 61/06 |

* cited by examiner

BALING APPARATUS

FIELD OF THE INVENTION

The present invention relates to a baling apparatus and in particular to a binding material storage apparatus for a baling apparatus for producing round bales.

BACKGROUND

Round balers are well known in the art. Such balers pick up a harvested crop and feed the crop into a baling chamber where it is compressed into a cylindrical bale. Before ejecting the formed bale from the baling chamber it is necessary to wrap or bind the formed bale with a binding material, for example film or netwrap. The binding material is typically supplied as a roll of binding material. It will be appreciated that the binding material is a major consumable in the operation of such a baler.

When binding material is drawn from a roll of binding material it is desirable that the binding material always have a constant pre-stretching regardless of the diameter of the roll of binding material. However, it also desirable that pre-stretching should be avoided before the binding material is introduced to the baling chamber. It is also desirable to carry out the pre-stretching differently for different phases of the binding process.

SUMMARY OF THE INVENTION

According to a first aspect of the invention, a binding material storage apparatus comprises a rotary magazine for storage of a plurality of rolls of binding material and first and second side elements between which the rotary magazine is supported for rotation about a horizontal axis between a plurality of discrete positions including a dispense position, each discrete position being suitable for storage of a roll of a binding material, the rotary magazine including first and second end plates between which a plurality of support elements extend, one support element for each of the plurality of discrete positions, each of the support elements being mounted for free rotation within the magazine, the binding material storage apparatus further comprising a spindle and a first gear element at each of the plurality of discrete positions and an electrically controlled braking gear supported on the second side element, each spindle being mounted for free rotation within the second end plate of the rotary magazine and connected at a first end to a second end of an associated support element and connected at second end to the first gear element, wherein the electrically controlled braking gear engages the first gear element in the dispense position.

This has as an advantage that the electrically controlled braking gear controls the speed of rotation of support element in the dispense position and so speed of rotation of the roll of a binding material supported thereon to control the pre-stretching of the binding material.

Preferably the binding material storage apparatus further comprises an electronic control unit in electrical communication with the electrically controlled braking gear. This has as an advantage that the electronic control unit can control the speed of rotation of the electrically controlled braking gear further to control the pre-stretching of the binding material.

Preferably the binding material storage apparatus further comprises a sensor to detect the size of the roll of binding material, the sensor being in electronic communication with the electronic control unit. This has as an advantage that the electronic control unit can further control the control the pre-stretching of the binding material depending on the size of the roll of binding material.

Preferably the electronic control unit is in electronic communication with apparatus to determine the kind of binding material on the roll of binding material. This has as an advantage that the electronic control unit can further control the control the pre-stretching of the binding material depending on the kind of binding material on the roll of binding material.

More preferably the apparatus to determine the kind of binding material on the roll of binding material is a user input device. Preferably the user input device is provided on a baler or in an operator's cab of an agricultural vehicle.

Alternatively, apparatus to determine the kind of binding material on the roll of binding material comprises a sensor to detect the kind of binding material on the roll of binding material.

BRIEF DESCRIPTION OF THE DRAWINGS

The invention will now be described, by way of example only, with reference to the accompanying drawings, in which.

DETAILED DESCRIPTION OF SPECIFIC EMBODIMENTS OF THE INVENTION

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Reference to terms such as longitudinal, transverse and vertical are made with respect to a longitudinal vehicle axis which is parallel to a normal forward direction of travel.

As is known in the art, binding refers to the binding of a bale within the baling chamber of a round baler and is distinguished from the binding of a bale outside of the baling chamber for example on a wrapping table of a wrapping apparatus.

Figure 1:
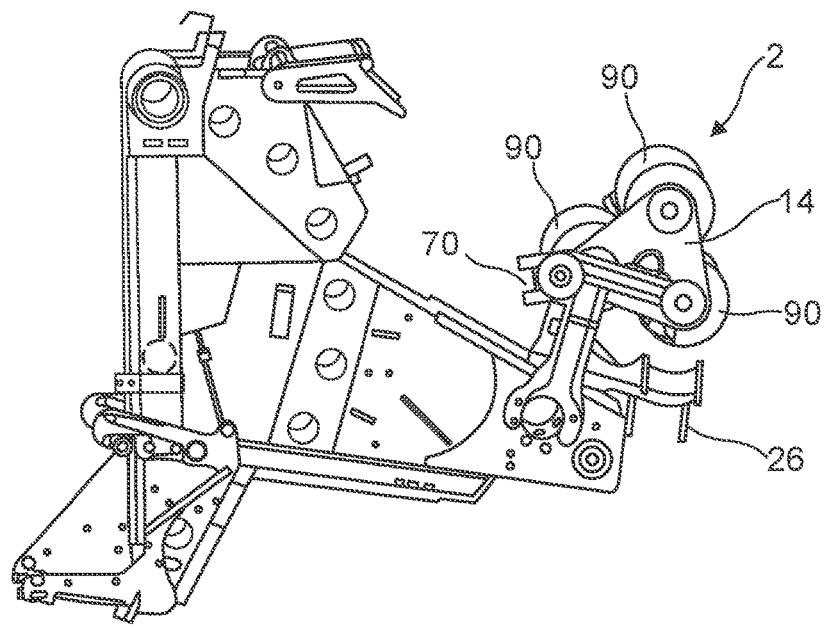
FIG. 1 shows a first side view of a binding material storage apparatus in accordance with the present invention located on a baler frame.
Figure 2:
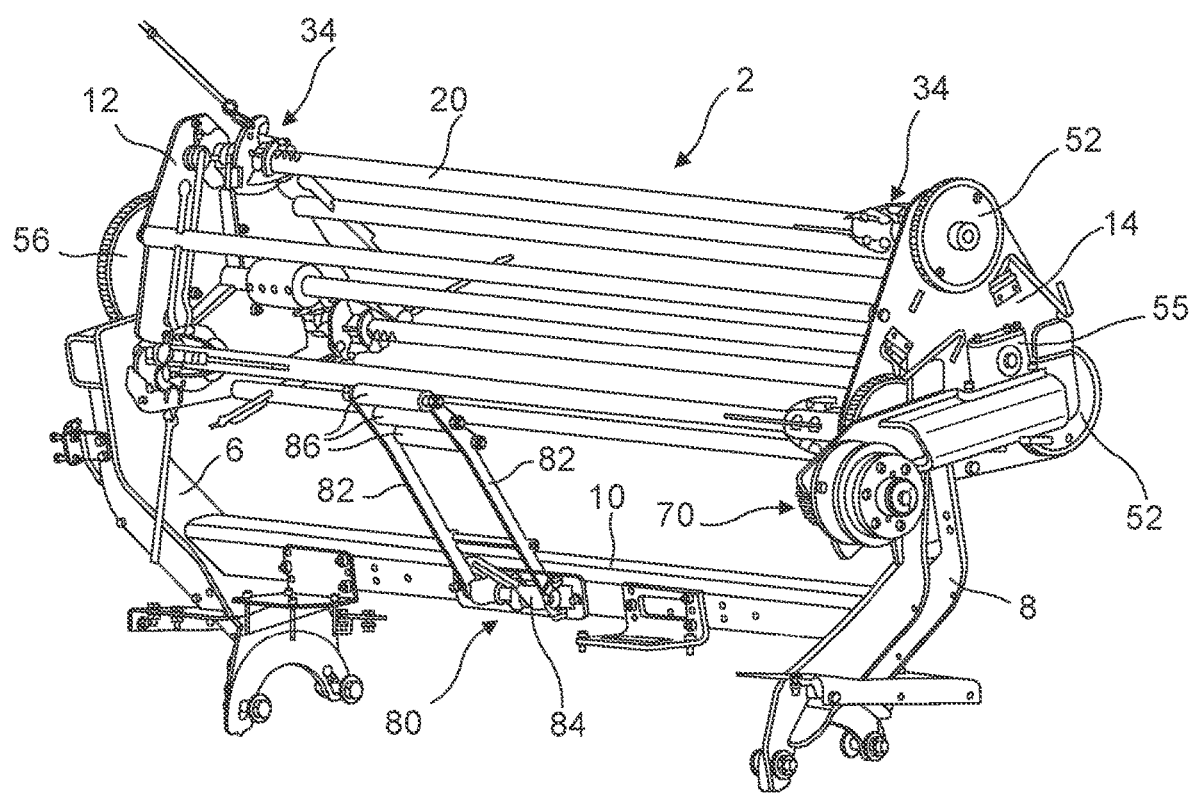
FIG. 2 shows a first perspective view of the binding material storage apparatus of FIG. 1.
Figure 3:
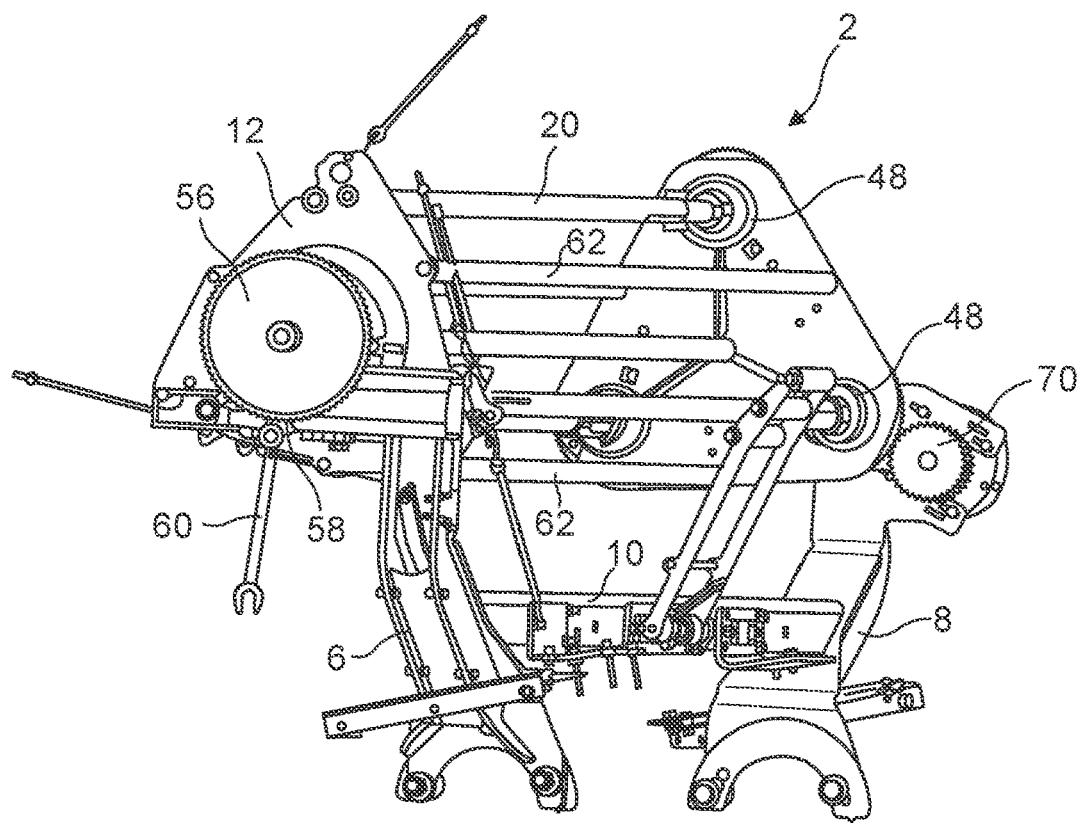
FIG. 3 shows a second perspective view of the binding material storage apparatus of FIG. 1.
Figure 4:
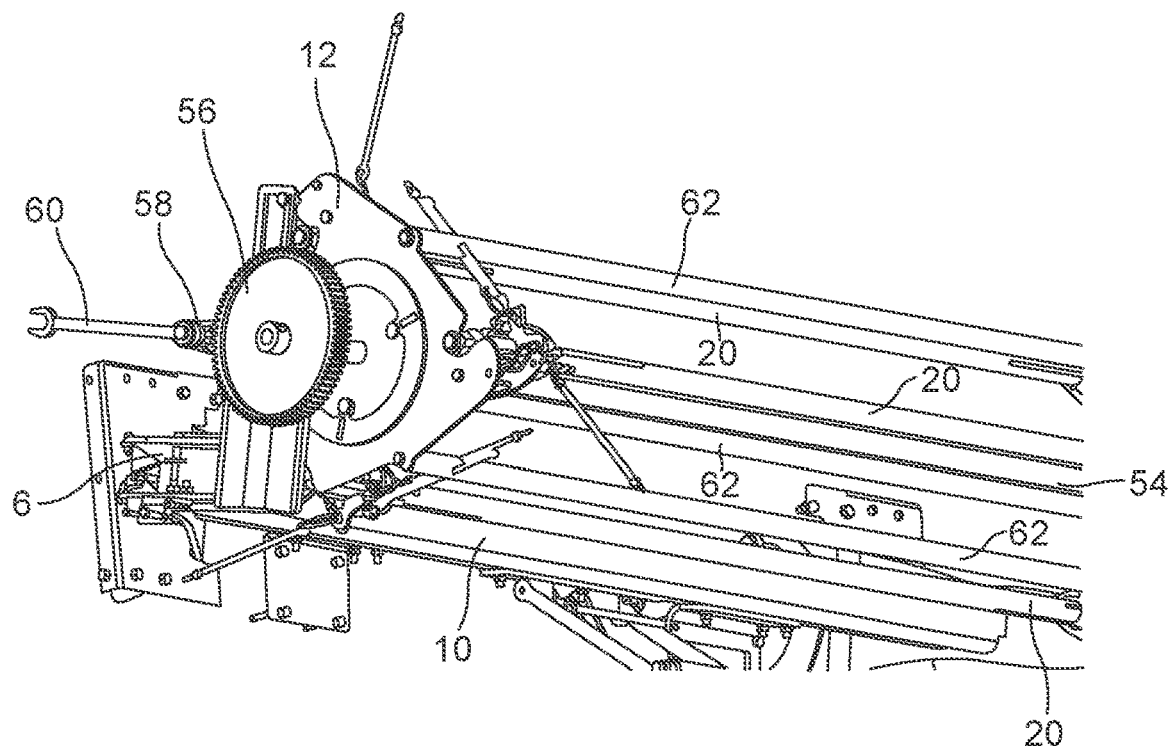
FIG. 4 shows a first perspective view of first end of the binding material storage apparatus of FIG. 1.

With reference to the Figures, a binding material storage apparatus 2 in accordance with the present invention is shown. The binding material storage apparatus 2 is provided with a support structure which in turn allows the binding material storage apparatus to be connected to a frame 4 of a baler (FIG. 1). The support structure comprises side elements 6,8 connected by a cross beam 10. Lower portions of each of the side elements 6,8 allow mounting of the support structure to the frame 4 of the baler in any suitable manner. Upper portions of each of the side elements 6,8 support the ends of the binding material storage apparatus as described below.

In the apparatus of the illustrated embodiment, up to three rolls of binding material 90 may be stored.

The binding material storage apparatus comprises a magazine located between the side elements 6,8. The magazine includes first and second end plates 12,14. A plurality of support elements 20 extend between the end plates 12,14. Each support element 20 is pivotally connected at a first end to first end plate 12 at a first side of the binding material storage apparatus and releasably connected at a second end to the second end plate 14 at the second side of the binding material storage apparatus.

Each support element 20 comprises a bar mounted for free rotation at a second end within an end housing 21. The end housing 21 is adapted to be received within a latching device 24 provided on the inner side of the first end plate 12.

A biased retaining pin 22 is mounted to the first side plate 12 of the binding material storage apparatus. A free end of the retaining pin 22 secures the latching device 24 in position on an inner side of the first side plate 12. The latching device 24 secures the first end of the support element 20 in a working position. By withdrawing the retaining pin 22 against the action of the biasing means, the latching device 24 is released allowing the first end of the supporting element 20 to be moved away from the first side plate 12 of the binding material storage apparatus. In practice, this allows the first end of the support element 20 to be angled down towards a suitable binding material roll support 26 located beneath the binding material storage apparatus.

Figure 5:
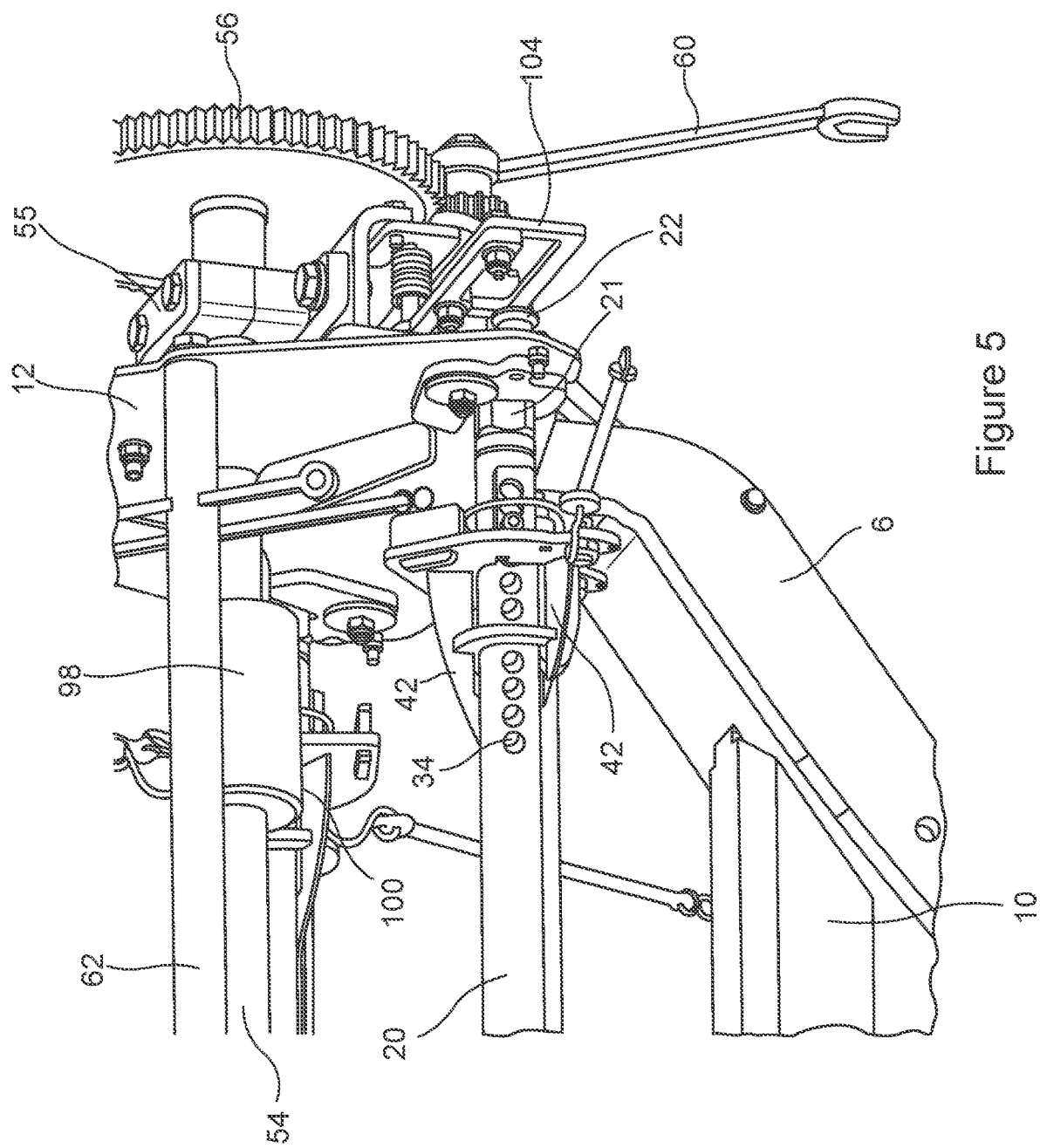
FIG. 5 shows a second perspective view of the first end of the binding material storage apparatus shown in FIG. 1.
Figure 6:
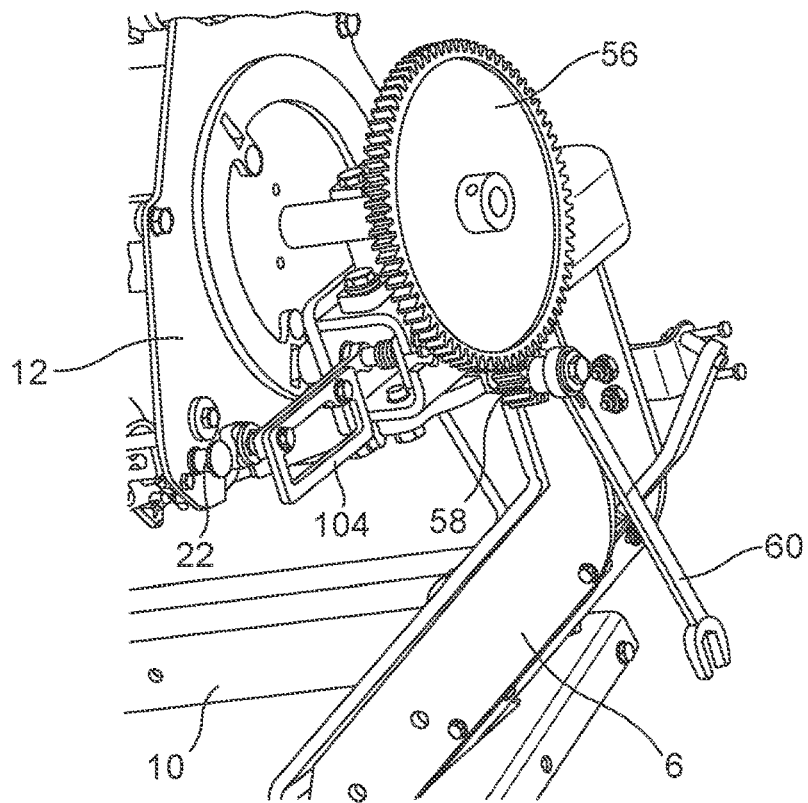
FIG. 6 shows a third perspective view of the first end of the binding material storage apparatus shown in FIG. 1.
Figure 7:
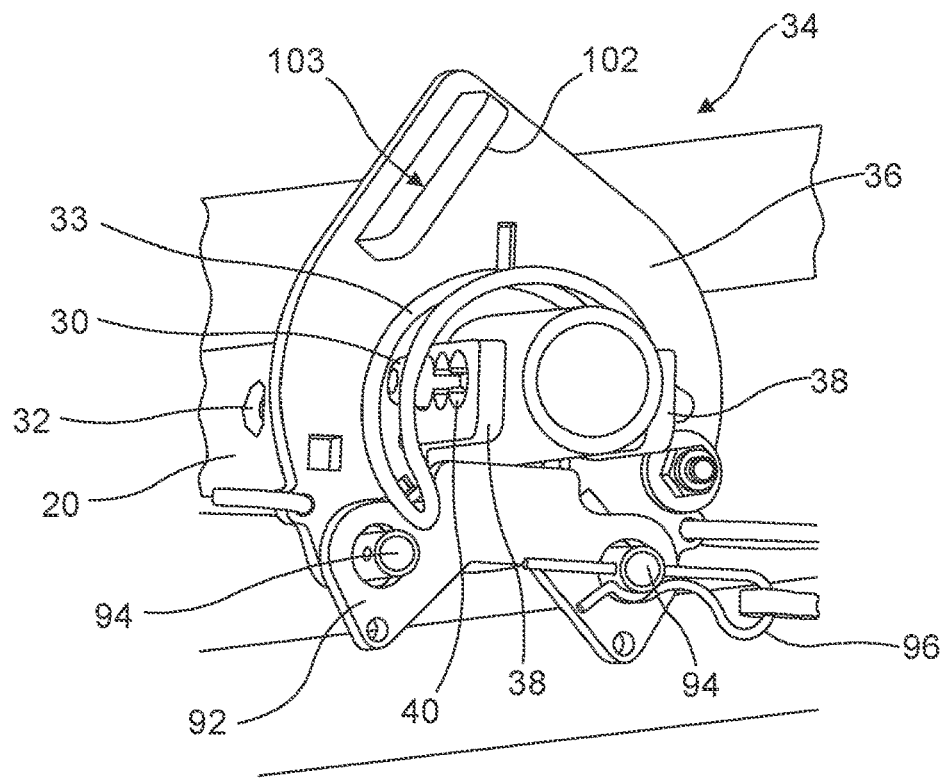
FIG. 7 shows a perspective view of an adjustable locating element suitable for use in the present invention.
Figure 8:
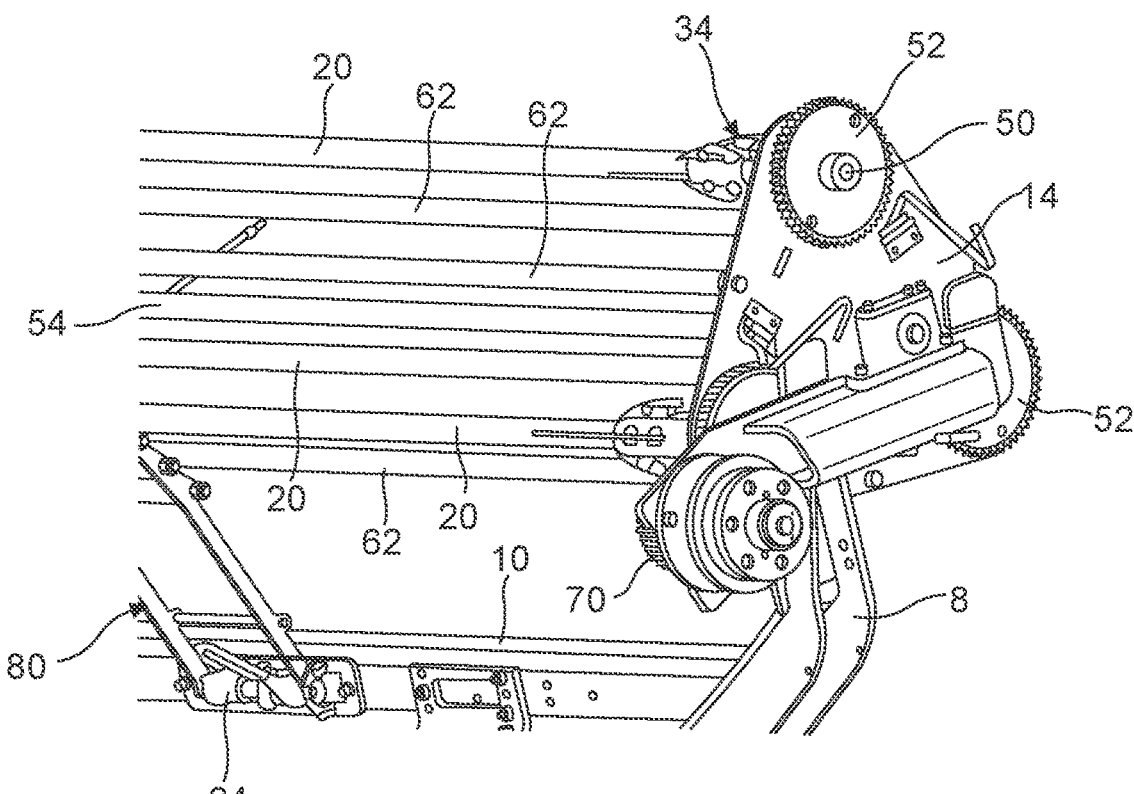
FIG. 8 shows a first perspective view of a second end of the binding material storage apparatus shown in FIG. 1.

Towards each end, each support member 20 is provided with a number of through bores 32. Where the bar of the support element 20 is formed as a tubular member, the though bore conveniently comprises a pair of diametrically aligned through bores (as shown in FIG. 5).

An adjustable locating element 34 is provided at each end of each support element 20. The adjustable locating element 34 comprises a main body portion 36 with a keyhole opening or channel allowing the adjustable locating element 34 to be passed over and be seated on the support element 20. Conveniently the inner end of the channel is semi-circular to allow proper seating of the adjustable locating element 34 on the support element 20. The main body portion 36 is provided with parallel lateral elements 38, each provided with a number of through bores 40. These through bores 40 are sized and located to be aligned with the bores 32 in the support element 20. The adjustable locating element 34 further comprises a plurality of circumferentially located fins 42. Each of the fins 42 incudes a curved edge arranged to be angled down towards the centre of the binding material storage apparatus when the adjustable locating element 34 is in position on the support element 20.

A first end of a clip 28 is pivotally attached to a second end of a peg 30 and is moveable between a first position in which the clip encircles a portion of a locating element mounted on the support element 20 and a second position in which it does not. In use, the peg 30 extends through both the adjustable locating element 34 and the support element 20 to locate the adjustable locating element 34 axially with respect to the support element 20.

Figure 9:
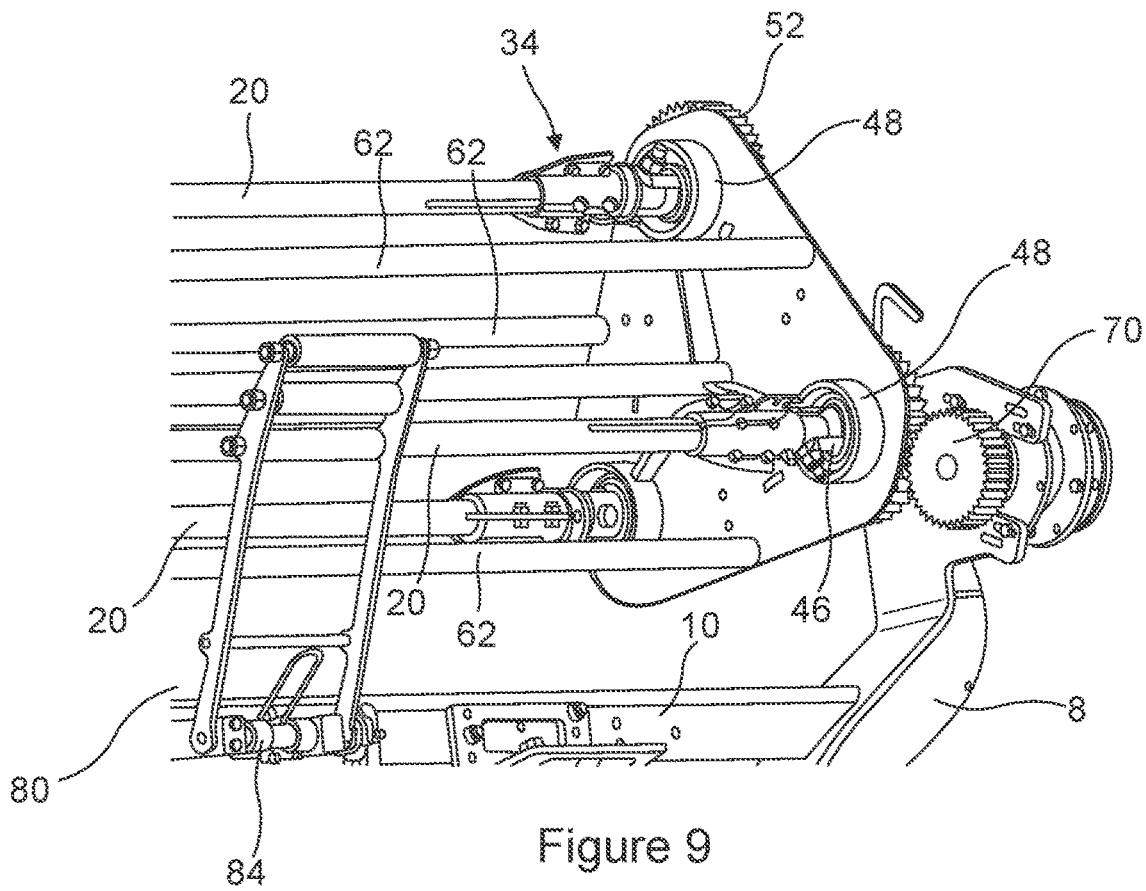
FIG. 9 shows a second perspective view of the second end of the binding material storage apparatus shown in FIG. 1.
Figure 10:
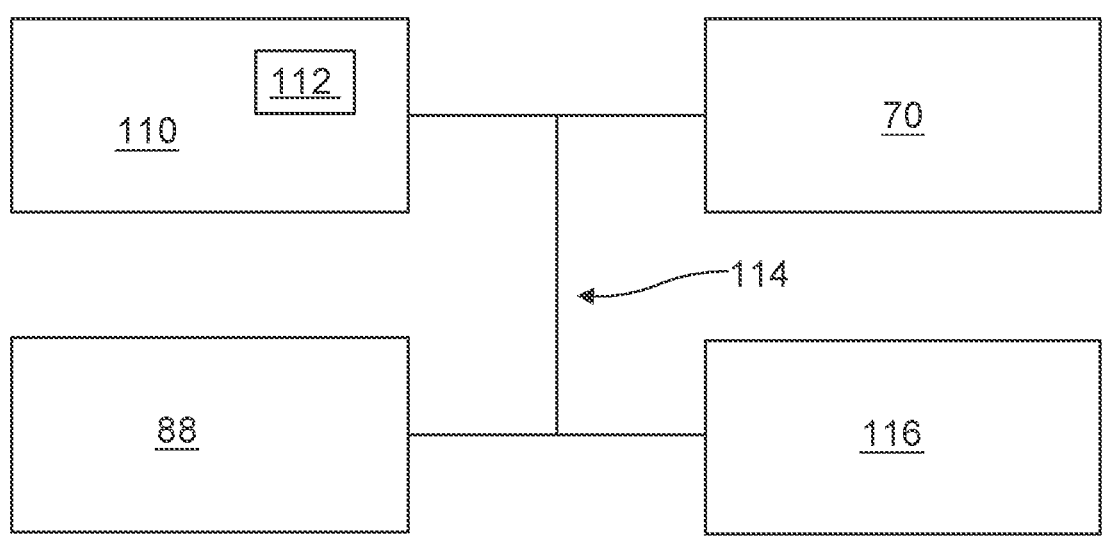
FIG. 10 shows a schematic view of elements of the invention.

The second end of the support element is supported at the second side of the binding material storage apparatus by a pivoting joint (FIG. 9). A further adjustable locating element 34 is fixed in a suitable manner towards the second end of each support element 20. The further adjustable locating element is of similar construction to the first adjustable locating element 34 and like reference numerals are used.

The second end plate 14 is provided with a plurality of openings. Each opening is provided with an inwardly extending boss 48. For each opening, a central spindle 50 is mounted in a suitable bearing. A gear 52 is mounted to each central spindle on an outer side of the second end plate 14. An inner end of each spindle 50 is provided with a clevis 46 for connecting with the second end of the support element by use of a clevis pin. In an alternative embodiment a universal joint may be used to connect the support member 20 with the central spindle 50.

The side element 8 at the second end of the magazine is provided with an electrically controlled braking gear 70.

The cross beam 10 is conveniently provided with a biased lever 80. The biased lever comprises first and second side arms 82. First ends of the side arms are connected by a connecting rod about which a biasing spring 84 is mounted. Second ends of the side arms are connected by a plurality of connecting pins on which are mounted rollers 86. The connecting pins are provided in an arcuate arrangement at the second end of the biased lever 80. Conveniently, the position of the lever may be detected by a sensor 88.

The sensor 88 is in electronic communication with an electronic control unit 110. The electronic control unit has access to a memory unit 112. The memory unit 112 may take any suitable form and is in electronic communication with the electronic control unit 110. The memory unit 112 is adapted to store, in any suitable manner such as a database or look up table, reference values as described below. The electronic control unit 110 is also in connection with the electrically controlled braking gear 70.

Conveniently the signals between the electronic components are provided by way of a suitable data communication network 114 such as one compliant with the ISOBUS standard (a network in conformance to ISO 11783).

The electronic control unit 110 may conveniently comprise a single processor located on the baler or its functions may be split between a first processor located on the baler and one or more additional processors located on an agricultural vehicle towing the baler, the additional processor(s) being in electronic communication with the first processor.

Apparatus 116 to determine the kind of binding material on the roll of binding material may also be provided in electronic communication with the electronic control unit 110. Such apparatus 116 may comprise a user operated input device by which the operator can indicate the kind of wrapping material present on the roll of wrapping material in the dispense position. The user operated input device may be provided on the baler or in an operator's cab of an agricultural vehicle used to tow the baler. Alternatively, such apparatus may comprise a sensor mounted on the baler to determine the kind of wrapping material present on the roll of wrapping material in the dispense position.

A central axle 54 extends through the first end plate 12 across the binding material storage apparatus 2 and through the second end plate 14. Each end of the central axle 54 is mounted in a suitable bearing provided in a mounting 55 provided at an upper end of each side support 6,8 of the binding material storage apparatus.

A first end of the magazine is provided with a drive mechanism to enable rotation of the magazine. A first end of the central axle 54 is provided with a larger gear 56 mounted outside of the first side support 6. The first side support 6 is further provided with a suitably located mounting aperture.

In the illustrated embodiment of FIGS. 1 to 9, a manual drive mechanism is provided. A releasable handle or crank 60 is provided with a smaller drive gear 58 mounted at one end about a guide pin or spigot. Conveniently smaller drive gear 58 is mounted by way of a clutch or ratchet mechanism to allow one-way movement of the smaller drive gear 58 with respect to the rest of the handle 60. In order to rotate the magazine, an operator engages the guide pin within the mounting aperture in the first side support 6. When the guide pin is correctly located in the mounting aperture, a periphery of the smaller gear 58 engages with a periphery of the first larger gear 56.

The handle 60 is used by an operator to rotate the second smaller drive gear 58, in turn causing rotation of the first larger gear 56 and so rotation of the magazine of the binding material storage apparatus 2.

In an alternative embodiment, not shown, the second smaller drive gear may be mounted directly to the first side support 6 and is provided with a powered drive means to be actuated by an operator by way of the electronic control means 110.

The drive means allows an operator to rotate the magazine of the binding material storage apparatus around an axis of rotation to enable selection of preferred roll of binding material 90—for example either to select a different binding material or to replenish an expired roll without the need to retrieve a roll of binding material for loading. Rotation of the magazine also causes the gears 52 on the second end to be rotated such that an initial gear 52 is disengaged from the electrically controlled braking gear 70 and the electrically controlled braking gear 70 then becomes engaged with a subsequent gear 52.

Guide elements 62 are arranged between the support elements 20. Each guide element 62 extends across the binding material storage apparatus 2 between the first and second end plates 12,14.

In the illustrated embodiment there are three support elements 20 arranged substantially equidistantly from one another, and three guide elements 62, each guide element 62 being located between adjacent pairs of support elements 20. In this embodiment the end plates 12,14 are substantially triangular with the support elements 20 arranged between the apexes of the end plates 12,14.

In practice, in order to load a roll of binding material, the first adjustable locating element 34 is removed from the support element 20 and the biased retaining pin 22 used to release the latching device 24 to allow the second end of the support element 20 to be released from the second side plate 14 of the binding material storage apparatus and allowed to incline at an angle.

Any empty rolls of binding material may then be removed from the support element 20.

Rolls 90 of binding material typically comprise a central tube around which has been wound a length of binding material. When the support element 20 is released in this way, the second end of the support element 20 is angled such that loading of the roll of binding material onto the binding material support 26 centres the second end of the support element 20 within a tube of a roll of binding material to be loaded. A fresh roll of binding material is then pushed into position along the support element 20 such that a first end of the tube of the roll of binding material engages with the fins 42 of the second adjustable locating element 46 thereby centring the first end of the roll of binding material on the support element 20.

The first adjustable locating element 34 is then returned to the second end of the support element 20 and pushed into the second end of the roll of binding material. A cross piece 92 is added to the open end of the channel (cf FIG. 7). The cross piece 92 passes over locating pins 94 provided on the main body portion 36 of the locating element 34 and secured in place using a clip 96 at each end of the cross piece 92, the clips 96 passing through a through opening in each respective locating pin 94. Conveniently the clips 96 are tethered to the adjustable locating element 34, in any suitable manner, so that the clips 96 do not become lost and are readily to hand for use by an operator.

The second end of the support element 20 (together with the roll of binding material) is then raised so that the second end of the support element 20 (more specifically the end housing 21) engages in the latch mechanism 24 and the second end of the support element 20 is once again supported at the second side of the binding material storage apparatus 2.

The central axle 54 is provided toward the second end with a radially enlarged region 98. This region is provided with a plurality of blind bores 100 arranged axially along the enlarged region 98.

A lever (not shown) is engaged at one end in one of the plurality of blind bores 100. The other end of the lever is rotated to engage an abutment surface 102 forming part of a protrusion 103 provided on the main body portion 36 of the adjustable locating element 34. Further rotation of the lever is used to drive the adjustable locating element 34 into the central tube of the roll of binding material and to bring the bores 40 in line with the bores 32 of the support element 20. The pin 30 can then be inserted to hold the adjustable locating element 34 in place. The clasp 33 attached to the end of the pin 30 is then pivoted about the adjustable locating element 34 to hold the pin 30 in position.

The larger gear 56 is provided with a spring biased locking handle 104. The locking handle serves to prevent undesired rotation of the rotary magazine.

The larger gear 56 is provided with a spring biased locking handle 104. The locking handle serves to prevent undesired rotation of the rotary magazine.

In order to load a subsequent roll of binding material, for example a roll of a different binding material, the operator needs to move the biased locking handle from a first position in which movement of the larger gear 56 and so the magazine is prevented to second position in which the larger gear may be driven.

In the embodiment of FIGS. 2 to 9, an operator then engages the removeable crank 60 is located in position with the first side element 6 so that the second smaller gear 58 engages the larger gear 56. The spring biased handle 104 can then be pivoted to the second position to release the larger gear 56. Rotation of the smaller gear 58 then causes the rotation of the binding material storage apparatus 20 about the axle 54. Once a further support element 20 is adjacent the binding material support 26, the spring biased handle 104 is returned to its initial position so that further movement of the larger gear 56 is prevented. The handle 60 is then removed from the second side element 6 and returned to a storage location. The process for loading a roll of binding material to a support element 20 may now be repeated.

Once the binding material storage apparatus 20 has been loaded with the desired binding material(s), the operator rotates the binding material storage apparatus 20 until a desired roll of binding material is in position adjacent a binding material feed apparatus. The operator next removes a free end of the appropriate binding material and loops this over an adjacent guide element 62 and then directs the free end of the appropriate binding material into the adjacent binding material feed apparatus.

The second adjustable locating element 34 provided at the first end of the support element 20 may also be axially adjustable to allow for differing widths of rolls of binding material, for example rolls of binding film are typically of greater width than rolls of netwrap. In such a case the pin 30 is removed and the adjustable locating element 44 moved along the support element 20 to the desired position and the pin 30 returned. Conveniently the holes 32 in the support element 20 are arranged to allow for central positioning on each support element 20 of the most common widths of rolls of binding material.

Once the desired roll(s) of binding material has been added to the binding material storage apparatus, a free end of the binding material is introduced into a suitable binding material feed apparatus. Following formation of a bale in a baling chamber of the baler, the binding material feed apparatus is operated to introduce the free end of the binding material into the baling chamber. The free end of the binding material then becomes caught between the rotating bale and the baling chamber and rotated with the bale within the baling chamber to wrap the formed bale in the baling chamber.

It is desirable that the binding material should, once being drawn into the baling chamber by the action of the rotating bale, be subject to pre-stretching to improve binding. The electronic control unit 110 can be used to control the speed of the electrically controlled braking gear 70 such that the binding material is subject to pre-stretching.

It is further desirable that the binding material should, once being drawn into the baling chamber by the action of the rotating bale, be subject to a constant pre-stretching regardless of the roll diameter. It is also desirable that the pre-stretching of the binding material be different for different phases of the binding process.

In practice if there is no change in the position of the lever 80, no binding material is being consumed. As binding material is removed from a roll 90 of binding material the diameter of the roll 90 of binding material decreases. As the diameter of the roll of binding material decreases singles sent from the sensor 88 to the electronic control unit 10 change. The electronic control unit 110 is able to determine by reference to signals from the sensor 88 the diameter of the roll 90 of binding material the speed at which the binding material is being unwound from the roll and the tension of the binding material. By reference to the memory unit 112, the electronic control unit 110 actuates the electrically controlled braking gear 70 to control the speed of rotation of the electrically controlled braking gear 70. Due to engagement of the electrically controlled braking gear 70 with the gear 52 in the dispense position, control of the electrically controlled braking gear 70 controls the speed of rotation of the support element 20 and the roll 90 of wrapping material secured to the support element 20 by the first and second adjustable elements 34, 44 and in this way controls the pre-stretching of the binding material.

It will be understood that the arrangement of the rollers 86 is selected to ensure that at least one of the rollers 86 is in contact with the outer diameter of a roll 90 of wrapping material mounted on the adjacent support element 20.

It is an advantage of the present invention that control of the pre-stretching of the binding material is possible at any time and at any diameter of the roll of binding material being used.

It is desirable that control of the pre-stretching of the binding material also takes into account the kind of binding material on the roll of binding material. As the electronic control unit 110 is in electrical communication with apparatus 116 to determine the kind of binding material, the electronic control unit 110 by reference to the memory unit 112 is able to control the speed of operation of the electrically controlled braking gear 70 to take account of the nature of the binding material being dispensed.

From reading the present disclosure, other modifications will be apparent to persons skilled in the art. Such modifications may involve other features which are already known in the field of round balers and component parts therefore and which may be used instead of or in addition to features already described herein.

The invention claimed is:

1. A binding material storage apparatus comprising:
   a rotary magazine for storage of a plurality of rolls of binding material and first and second side elements between which the rotary magazine is supported for rotation about a horizontal axis between a plurality of discrete positions including a dispense position, each discrete position being suitable for storage of a roll of a binding material, the rotary magazine including first and second end plates between which a plurality of support elements extend, one support element for each of the plurality of discrete positions, each of the support elements being mounted for free rotation within the magazine; and
   a spindle and a first gear element at each of the plurality of discrete positions and an electrically controlled braking gear supported on the second side element, each spindle being mounted for free rotation within the second end plate of the rotary magazine and connected at a first end to a second end of an associated support element and connected at a second end to the first gear element, wherein the electrically controlled braking gear engages the first gear element in the dispense position.

2. The binding material storage apparatus of claim 1, further comprising an electronic control unit in electrical communication with the electrically controlled braking gear.

3. The binding material storage apparatus of claim 2, further comprising a sensor to detect the size of the roll of binding material, the sensor being in electronic communication with the electronic control unit.

4. The binding material storage apparatus of claim 2, wherein the electronic control unit is in electronic communication with an apparatus to determine the kind of binding material on the roll of binding material.

5. The binding material storage apparatus of claim 4, wherein the apparatus to determine the kind of binding material on the roll of binding material is a user input device.

6. The binding material storage apparatus of claim 5, wherein the user input device is located on a baler.

7. The binding material storage apparatus of claim 5, wherein the user input device is in an operator's cab of an agricultural vehicle.

8. The binding material storage apparatus of claim 4, wherein the apparatus to determine the kind of binding material on the roll of binding material comprises a sensor to detect the kind of binding material on the roll of binding material.

\* \* \* \* \*